United States Patent [19]

Duurland

[11] Patent Number: 4,864,439
[45] Date of Patent: Sep. 5, 1989

[54] APPARATUS DRAWER FOR UNAMBIGUOUSLY RECEIVING A DIGITAL AUDIO TAPE CASSETTE

[75] Inventor: Jozef M. Duurland, Leusden, Netherlands

[73] Assignee: Polygram International Holding B.V., New York, N.Y.

[21] Appl. No.: 145,853

[22] Filed: Jan. 20, 1988

[30] Foreign Application Priority Data

May 29, 1987 [NL] Netherlands .......................... 8701279

[51] Int. Cl.$^4$ ...................... G11B 15/00; G11B 5/008
[52] U.S. Cl. ..................................... 360/96.5; 360/132
[58] Field of Search ....................... 360/96.5, 93, 96.1, 360/96.6, 8 S, 9 S, 132

[56] References Cited

U.S. PATENT DOCUMENTS 4,576,345  3/1986  Koken et al. ......................... 242/198
4,706,141  11/1987  Oba et al. ............................ 360/96.5

FOREIGN PATENT DOCUMENTS 0178774  8/1986  Japan ................................. 360/96.5
0180958  8/1986  Japan ................................. 360/96.5
0182660  8/1986  Japan ................................. 360/96.5

Primary Examiner—Stuart N. Hecker
Assistant Examiner—David J. Severin
Attorney, Agent, or Firm—David R. Treacy

[57] ABSTRACT

A magnetic-tape-cassette apparatus has a loading device which prevents improper insertion of a digital audio tape cassette having a slide for closing the cassette openings. The cassette has a U-shaped slide which, in the closed position, defines one side of a slot extending halfway up to opposite side wall of the cassette housing and across the bottom wall of the cassette housing. The loading device has two positioning elements, a respective one near each side of the loading device bottom section, arranged so that the positioning elements engage the parts of the slot extending up the side walls when the cassette is properly inserted on the bottom section of the loading device. When the loading device moves the cassette toward the apparatus interior, the positioning elements are withdrawn from engagement in the slot, the cassette slide is unlatched, and the slide is then moved with respect to the rest of the cassette to an open slide position which permits the cassette cover to be opened so that the cassette tape can be threaded and played. The slot in the cassette is disposed a shorter distance from the cassette rear wall than from the cassette front wall, so that the cassette cannot be fully received on the loading device if it is improperly oriented. A cassette detector detects the presence of the cassette only if it is so inserted that the projections engage the slot portions extending up the side walls of the cassette.

17 Claims, 3 Drawing Sheets

ABSTRACT# APPARATUS DRAWER FOR UNAMBIGUOUSLY RECEIVING A DIGITAL AUDIO TAPE CASSETTE

BACKGROUND OF THE INVENTION

The invention relates to a combination of a magnetic-tape-cassette apparatus comprising a loading device, and a magnetic-tape cassette; and more particularly to an apparatus having a loading drawer which comprises a bottom section which is adapted to receive the cassette and which is movable between a first position substantially outside the apparatus housing or casing and a second position substantially inside the apparatus casing.

The cassette is of the type comprising a housing having a U-shaped slide arranged on the outside of the housing, a main position being slidable along the bottom wall of the housing, and two side portions being slidable along two facing side walls of the housing. These side portions extend from the main portion to substantially half the height of the adjacent side wall. The rear edge of the slide faces a rear wall of the housing and is spaced from the front edges of raised portions of the bottom wall and of the side walls when the slide is closed. In the closed position of the slide this spacing forms a slot in the housing between the front edges of the raised portions and the rear edge of the slide. In its longitudinal direction the slot extends parallel to the rear wall over the entire width of the bottom and to substantially half the height of the side walls, and is situated at a shorter distance from the rear wall than from a front wall of the housing.

A combination of this type is known from EP-A-204.585. It utilizes magnetic-tape cassettes intended for recording and/or reproducing digitally encoded signals, in particular audio signals, on or from a magnetic tape. In such a compact magnetic-tape cassette the U-shaped slide has an important function, to close the housing against the penetration of contaminants. Owing to its construction and other properties this magnetic-tape cassette with the magnetic tape contained therein is suitable for use as an information carrier for signals whose characteristics are comparable in quality to those recorded on optically readable audio discs of the Compact Disc type. The compact construction renders this magnetic-tape cassette suitable for use in magnetic-tape equipment in which the cassette can be placed conveniently and rapidly on the bottom section of a loading drawer or device of the recording or playing apparatus, after which it is brought into an operating position inside the apparatus casing or housing by means of the loading device.

However, the compact construction and the fully closed housing of this cassette make it difficult for the user of the known combination to ascertain in which position the cassette is to be placed on the bottom section of the loading device. When an incorrectly positioned cassette is brought into the apparatus casing, this may cause malfunctioning, defects and loss of time. This is likely to occur in particular under poor lighting conditions when an apparatus is to be loaded blindly, such as in cars, in the case of illegible or incorrectly labelled cassettes, and in the case of visually handicapped users.

SUMMARY OF THE INVENTION

It is an object of the invention to facilitate the insertion of such a cassette having a slide closure into an apparatus loading device in an unambiguously defined position.

To this end the invention is characterized in that the loading device comprises two positioning elements, each arranged near one side of the bottom section. At least in the first position of the loading device these positioning elements project upwardly from the bottom section to engage in the parts of the slot in the cassette housing which are situated between a side portion of the slide and the adjoining raised portions of the side walls of the cassette housing, and thereby unambiguously define the position of the cassette relative to the loading device.

The presence of the positioning elements on the bottom section of the loading device ensures that after the cassette has been placed on the bottom section the cassette lies flat on the bottom section only when the cassette is in the correct position and those parts of the slot near the cassette side walls are engaged by the positioning elements.

Since the side walls of the magnetic-tape cassette of said type have no local interruption above the side portions of the slide, so that the upper wall of the cassette housing is uninterrupted near the side walls, the upper wall of the cassette will abut against the positioning elements when the cassette is inserted into the loading device with its upper wall facing the bottom section. Thus if the cassette is inserted upside down, it will be easy to observe that the cassette is sitting obliquely on the bottom section. This enables the user to take the cassette "blindly" and insert it into the loading device without paying special attention.

The unambiguous positioning inside the loading device ensures that in the correct position the upper side of the magnetic-tape cassette is always remote from the bottom section. In practice this upper side of the cassette is the only side which can be provided with a label describing the contents of the cassette. The unambiguous positioning thus ensures that the label always faces upwards in the loading device, so that the label can always be read in the open first position of the loading device. The arrangement of the positioning elements near the side walls of the cassette housing has the further advantage that the larger part of the surface area of the bottom section of the loading device can be adapted specifically to its loading function.

It is to be noted that from the publication JP-A-61-182660 a combination of a magnetic-tape-cassette apparatus and a cassette is known, in which the apparatus is provided with a plurality of fixed positioning elements arranged on the bottom section of the loading device for correctly positioning the cassette. These elements comprise two ridges which extend in the width direction of the bottom section and a photo-detector situated near the rear of the bottom section. Such an arrangement of positioning elements means that an important part of the surface area of the bottom section of the loading device is provided with projections, which may impair the loading function of the loading device, especially when the cassette is being moved to a sensing device of the magnetic tape apparatus. The cassette used in this known combination is not provided with a slide and does not have slot parts adjacent the side walls; the positioning elements used therein are therefore not capable of effectively detecting the presence of a cassette of the type used in my invention.

Also in this respect in the preferred embodiment of the invention the positioning elements comprise two projections of the loading device which are situated near facing sides of the bottom section. These sides extend parallel to the direction of movement of the loading device. Arranging the two projections near said sides of the bottom section has the advantage that during insertion into the loading device the cassette can readily move over the projections, allowing the loading device to move inwards immediately after this.

In the preferred embodiment of the invention the loading device comprises detection means which in the first position of the loading device detect the presence of the cassette housing only if the projections engage in the slot of the cassette housing. Such detection means make it possible to ascertain whether the cassette has been inserted correctly and, for example, in the event of incorrect insertion may disable the drive of the loading device or may generate a signal to indicate incorrect insertion.

In this respect it is preferred that the detection means comprise a switching element situated in the area between the projections and projecting from the bottom section to a level below the free ends of the projections. The use of such a switching element ensures that a part of the apparatus is rendered operative only when the cassette has been inserted correctly. This may be for example the drive of the loading device.

Another preferred embodiment of a combination in accordance with the invention is characterized in that each projection is arranged to be movable relative to the bottom section, the projection being moved out of the slot in the cassette housing during the movement of the loading device from its first position to its second position. Thus, the slot is cleared during the loading movement, allowing the slide to be opened without being obstructed by projections.

In this respect a further preferred embodiment is characterized in that each projection is arranged on a movable element which is part of the loading device and is moved for displacement of the projections during operation of a loading mechanism of which the loading device forms a part. The mechanism does not move the cassette slide towards the rear wall of the cassette housing to permit the cassette to be opened until the projection has become disengaged from the slot. This has the advantage that the loading mechanism does not actuate the slide until disengagement of the projections. Preferably, the drawer slide is opened during the loading movement after the slide has been unlatched and the projections are clear of the slot.

The invention further relates to a magnetic-tape-cassette apparatus which forms part of such a combination and which for this purpose comprises a loading device having a bottom section and having two positioning elements for the magnetic-tape cassette, the elements projecting upwardly over some distance from the bottom section at least in a first position of the loading device.

An embodiment of the invention will be described in more detail, by way of example, with reference to the drawing.

DESCRIPTION OF THE PREFERRED EMBODIMENT

Figure 1:
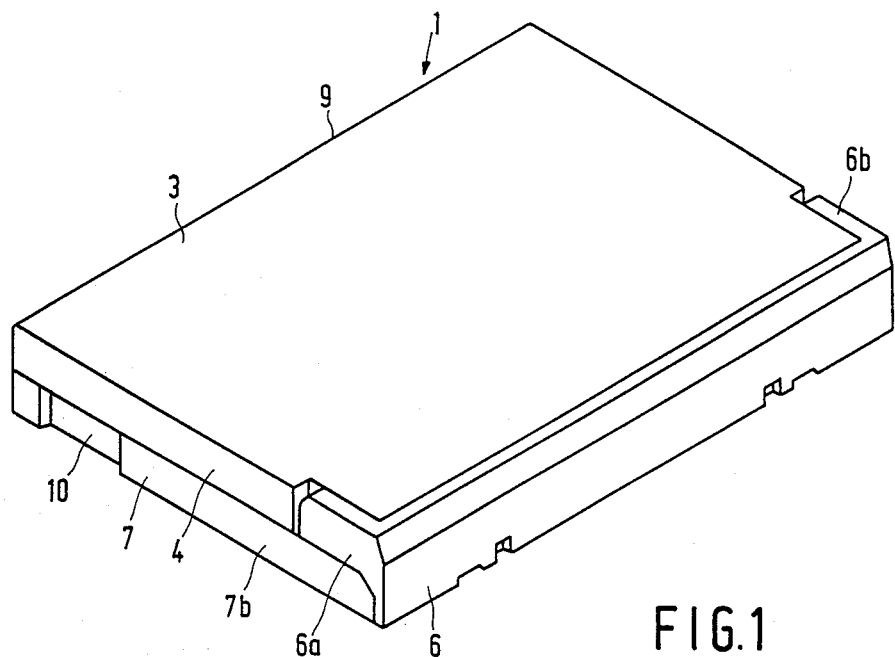
FIG. 1 is a perspective plan view of a magnetic-tape cassette forming part of the combination in accordance with the invention.
Figure 2:
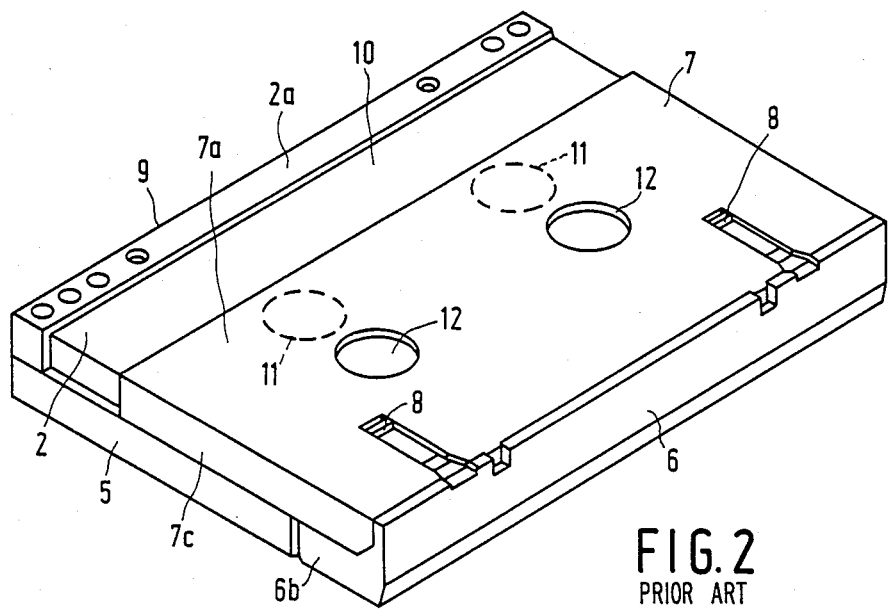
FIG. 2 is a perspective underneath view of the magnetic-tape cassette shown in FIG. 1.

The magnetic-tape cassette shown in FIGS. 1 and 2 comprises a housing 1 having a bottom wall 2 and an upper wall 3. Further it comprises two facing side walls 4 and 5, which for about one half form part of the same housing section to which the upper wall 3 belongs and for the remainder form part of the same cassette-housing section to which the bottom wall 2 belongs. The separation between these housing sections is situated at substantially half the distance between the bottom wall 2 and the upper wall 3. At the front the housing 1 is closed by a pivotable front cover 6, which shields a magnetic tape, not shown, inside the housing against the penetration of dirt and against touching. Near the side walls 4 and 5 the front cover 6 comprises side flanges 6a and 6b by means of which the cover is pivotally connected to the housing.

The front cover 6 is latched in the closed position by means of a U-shaped slide 7, which outside the housing adjoins the bottom wall 2 with a main portion 7a and which is guided along the two facing side walls 4 and 5 with two side portions 7b and 7c respectively. The front cover 6 is latched in that the side flanges 6a and 6b engage against edges at the ends of the side portions 7b and 7c respectively. In its turn the slide 7 is latched by means of latching projections 8 arranged in the housing. For a further description of the operation of the latching projections 8 and other parts of the cassette reference is made to EP-A-0,162,487 (to which U.S. Pat. No. 4,576,345 corresponds), herewith incorporated by reference. The side portions 7b and 7c extend from the main portion 7a up to substantially half the distance between the bottom wall 2 and the upper wall 3. Thus, in the closed position of the slide, as is shown in FIG. 2, a slot 10 is formed between a raised portion 2a of the bottom wall 2 and the rear edge of the slide which faces the rear wall 9 of the housing, the longitudinal direction of said slot extending substantially parallel to the rear wall 9 and being situated at a substantially shorter distance from the rear wall 9 than from the front cover 6. The slot 10 extends across the full width of the bottom wall 2 and continues in the side walls 4 and 5 up to substantially half the height of the side walls. It is to be noted that the remaining parts of the side walls 4 and 5, as is shown in FIG. 1, are not interrupted at the side of the upper wall 3, so that the upper wall 3 has an uninterrupted shape at least at the rear part of the cassette housing.

The slide 7 also serves for closing the winding-spindle openings 11 in the bottom wall 2. In the non-illustrated open position of the slide 7 openings 12 in the main portion 7a of the slide are in register with the openings 11 through which winding spindles 14 can be inserted into the cassette to drive the magnetic tape reels after the cassette has been loaded into a magnetic-tape-cassette apparatus 13, shown in FIGS. 3 and 4. In the closed position the slide 7 closes the winding-spindle openings 11 to prevent the penetration of contaminants. Further, in a manner not shown, the slide 7 indirectly exerts pressure on braking means which block the tape reels to prevent the tape from being unwound.

Figure 3:
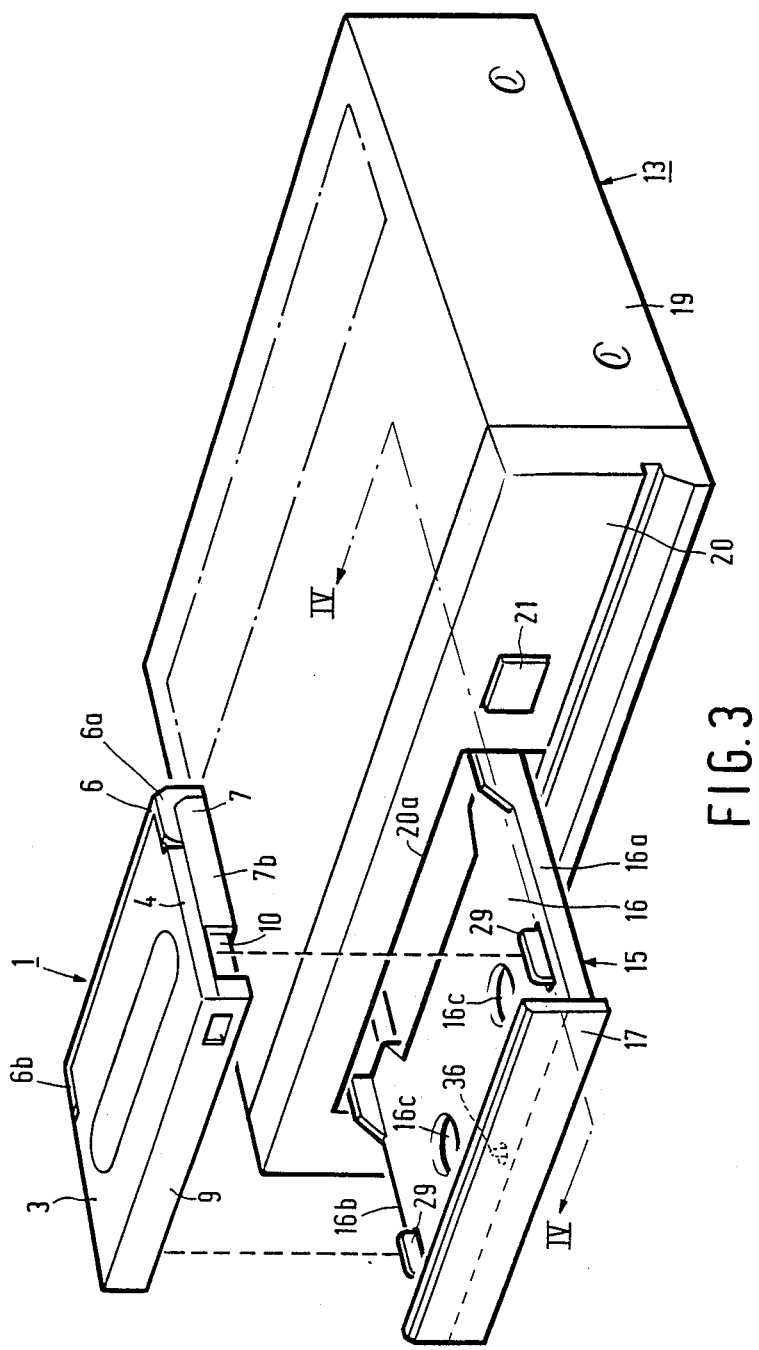
FIG. 3 is a perspective view of the combination in accordance with the invention, the magnetic-tape cassette being shown at a distance above the loading device for a better understanding of the invention.
Figure 4:
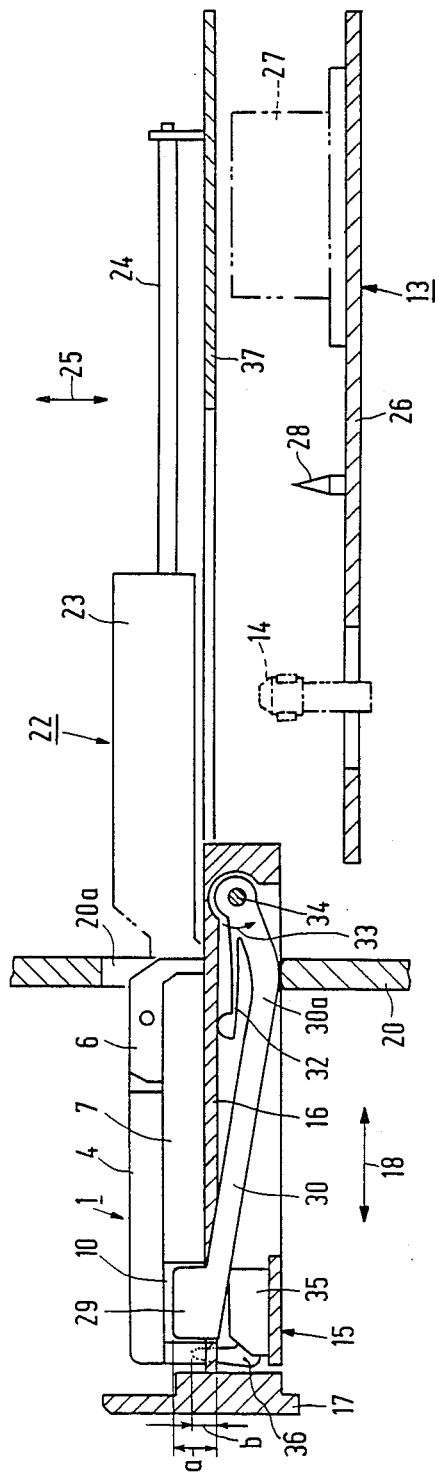
FIG. 4 shows the combination in a sectional view taken on the lines IV—IV in FIG. 3.

FIGS. 3 and 4 show the magnetic-tape cassette of FIGS. 1 and 2 in combination with the magnetic-tape-cassette apparatus 13. This apparatus 13 comprises a loading device 15 which in the present embodiment is constructed as a drawer and comprises a bottom section 16 and a front section 17. The loading device 15 is guided to be slidable into the apparatus casing or housing 19 through an opening 20a in a front panel 20 in a direction parallel to the double arrow 18, the device thus being moved from the first position shown in FIGS. 3 and 4 to a second position, not shown, inside the apparatus casing 19. This movement is controlled by drive means not shown, a control key 21 being arranged on the front panel 20 to start the inward and outward movements. In the closed position, not shown, the front section 17 is flush with the front panel 20.

The loading device 15 forms part of a loading mechanism 22 of the apparatus 13, which mechanism also comprises a transfer means 23 situated inside the apparatus casing 19. After insertion during the inward movement of the loading device 15 this transfer means produces a sliding movement of the cassette over the bottom section 16. During this movement, in a manner not shown, the cassette is moved over ridges on the bottom section 16, which ridges actuate the latching projections 8 to unlatch the slide 7. During the sliding movement of the cassette after unlatching the slide 7 is retained in a manner not shown, the slide being set to an open position and the front cover and said braking means being released.

In a manner not shown the loading device 15 is constructed in such a way that the bottom section 16 becomes disengaged from the front section 17 during operation of the loading mechanism 22. This enables the bottom section 16 to move further inwards with the cassette. This movement is also performed uner the influence of the movement of the transfer means 23, the transfer means 23 being guided over guide rods 24 arranged on a frame plate 37. After the transfer means has reached its rearmost position inside the apparatus casing 19 the bottom section 16 is moved downwards, in a manner not shown, in a direction parallel to a double arrow 25 towards a deck plate 26 which supports the tape deck of the apparatus, which tape deck comprises the winding spindles 14 and a drum-shaped scanning means 27. During the downward movement the winding spindles can pass through openings 16c in the bottom section 16 to be coupled to the tape reels inside the cassette. The deck plate 26 also carries centering pins 28, which center the cassette, in a manner not shown, after the cassette has been lowered and which cooperate with openings, not shown, in the cassette housing 1. During the downward movement the front cover 6 is opened in a manner not shown, and after the cassette has been lowered the magnetic tape is withdrawn from the cassette over a part of its length and is wrapped around the scanning means 27.

For a more comprehensive description of the operation of the loading mechanism 22 and other parts of the apparatus 13 reference is made to European Patent Application No. EP-A 204,585 (herewith incorporated by reference).

In the bottom section 16 of the loading device 15 two positioning elements 29 are provided, which project over some distance from the upper side of the bottom section 16 in the first position of the loading device 15. The positioning elements are constructed as projections 29 and have such dimensions that once a cassette has been inserted, as is shown in FIG. 4, they engage in that part of the slot 10 which is situated between a side portion 7b and 7c respectively of the slide 7 and the adjoining raised portion of one of the side walls 4 and 5 of the cassette housing. The projections 29 extend substantially perpendicularly to the bottom section 16 and suitably fit at least substantially in the lateral portion of the slot 10. The projections 29 are each situated near one of the side 16a and 16b of the bottom section, which sides extend parallel to the double arrow 18. Each projection 29 is arranged on a lever 30 which is movable relative to the bottom section 16 and for this purpose is connected to the bottom section so as to be pivotable about a spindle 34. Preferably, the lever 30 is constructed as a plastic molding and is integral with a spring 32 which tends to pivot the lever 30 in the direction indicated by the arrow 33. In the first position of the loading device 15 this pivotal movement is inhibited in that a curved portion 30a of the lever 30 engages an edge of the opening 20a in the front panel 20. Thus, in the situation shown the lever 30 is stabilised in the upper position, the projection 29 projecting upwardly from the upper surface of the bottom section 16. As the loading device 15 moves inwards, the portion 30a becomes disengaged from the edge of the opening 20a, allowing the spring 32 to pivot the lever 30 and hence the projection 29 in the direction indicated by the arrow 33, so that the projection 29 is moved out of the slot 10. During the inward movement of the loading device 15 this results in the slot 10 being cleared automatically, enabling the sliding plate 7 to be slid freely towards the rear wall 9 after unlatching. During the outward movement the projection 29 again engages in the slot 10 by abutment of the portion 30a against the edge of the opening 20a, so that the projection 29 is again in an operating position.

The bottom section 16 further carries a switch 35 which is part of a detection means for detecting the absence of the cassette, this means including a switching element 36. In the position shown in FIG. 4 the switching element 36 is pressed downwards by the weight of the cassette when the cassette is placed on the bottom section 16. Therefore, the switch 35 is constructed as a microswitch, which requires only a small actuating pressure. It is important that in the absence of a cassette the switching element 16 projects from the upper surface of the bottom section 16 over a distance b which is smaller than the distance a over which the projection 29 projects from the bottom section 16 (FIG. 4). Thus, a cassette can actuate the switching element 36 only after the projections 29 have travelled a suitable distance in the slot 10. However, if a cassette is placed incorrectly on a bottom section 16, i.e. in a position in which the front cover 6 is not situated with the side flanges 6a and 6b upwards and with its main portion situated in or adjacent the opening 20a as shown in FIG. 4, the projections 29 cannot enter the slot 10 and the cassette remains in an oblique position in the loading device 15. This means that the switching element 36 is then not actuated. As a result of this, the switch 35 now supplies a command to the control circuit of the drive means for the loading device 15, so that actuation of the control key 21 cannot lead to an inward movement of the loading device. If desired, an indicator for mis-insertion of the cassette may be provided on the front panel 20.

Thus, the positioning elements 29 ensure that the user can rapidly detest that the cassette has been inserted in an incorrect position, the detection means 36 inhibiting operation of the loading mechanism 22 in the case of an incorrectly inserted cassette. This ensures that an incorrectly inserted cassette cannot cause malfunctioning or defects. An incorrectly inserted cassette is situated obliquely on the bottom section 16, which is easy to observe. The cassette lies flat on the bottom section 16 only when inserted in the correct position, which is defined unambiguously by the positioning elements 29. Thus, the positioning elements 29 make it possible to ascertain "blindly" whether the cassette has been inserted correctly.

It is to be noted that the construction in accordance with the invention, where the loading device 15 of the apparatus 13 cooperates with the cassette by means of the positioning elements 29 engaging in the slot 10, can also be used advantageously in a loading device which moves the cassette into the apparatus housing 19 in a manner other than shown. One alternative is to utilize a cassette receptacle with a vertically disposed bottom section 16, which receptacle can be pivoted out of a position parallel to the front panel 20 in order to insert the cassette. Another possibility is the use of a loading device 15 in which the cassette is inserted from the top of the apparatus casing or housing 19 and the bottom section 16 performs a downward movement. Thus, the invention can be used advantageously in all cassette loading means comprising a bottom section 16 on which the cassette is placed and which is subsequently moved into the apparatus housing 19 for the purpose of loading.

It is to be noted that it is possible to move the projections 29 out of the slot 10 in a manner other than shown during the inward movement of the bottom section 16. For example, the projections 29 may be moved towards the sides 16a and 16b of the bottom section 16 instead of downwards. Instead of the mechanical detection by means of the switching element 36 it is also possible to detect the presence of the cassette housing 1 photo-electrically. Alternatively, the drive means for the loading device 15 may be actuated directly by the switching element 36, so that immediately after the correct insertion of the cassette the loading device 15 is moved inwards without a control key being actuated.

What is claimed is:

1. A combination of a magnetic-tape-cassette apparatus comprising an apparatus casing and a loading device, and a magnetic-tape-cassette, said loading device comprising a bottom section which is adapted to receive the magnetic-tape-cassette and which is movable in a direction of movement between a first position substantially outside the apparatus casing and a second position substantially inside said casing, said cassette comprising a housing having a bottom wall, two facing side walls, a rear wall and a front wall, said bottom and side walls having respective raised portions; and a U-shaped slide having a main portion and two side portions, so arranged on the outside of the housing that the main portion is slidable along the housing bottom wall between a closed position and an open position, and the side portions are slidable along the respective facing side walls, said side portions each extending from the main portion to substantially half the height of the adjacent side wall, the slide having a rear edge facing said rear wall, in the closed position of the slide said rear edge being spaced from front edges of said raised portions of the bottom wall and the side walls, such that in the closed position of the slide an elongated slot is formed in the housing between the front edges of the raised portions and the rear edge of the slide, said slot extending in a longitudinal direction parallel to said rear wall across the entire width of the bottom, and up said side walls to substantially half the height of the side walls, and said slot being situated a shorter distance from the cassette rear wall than from the front wall, characterized in that the loading device comprises two positioning elements, each arranged adjacent a respective side of the bottom sections, at least in the first position of the loading device said positioning elements projecting upwardly from the bottom section to engage in respective parts of the slot situated between a respective slide side portion and the respective adjacent raised portions of the housing side walls, said positioning elements thereby unambiguously defining the inserted position of the cassette relative to the loading device.

2. A combination as claimed in claim 1, characterized in that said bottom section sides are facing sides extending parallel to said direction of movement of the loading device, and in that each positioning element comprises a respective projection disposed near a respective facing side of the bottom section and having a respective free end.

3. A combination as claimed in claim 2, characterized in that the loading device comprises means for permitting relative movement of each projection with respect to the bottom section, for disengaging each projection from said slot during movement of the bottom section from its first to its second position.

4. A combination as claimed in claim 3, characterized in that said means for permitting comprises at least one movable element connected to the loading device and supporting a said projection, and movable to displace the respective projection during movement of the bottom section, said loading device forming part of a loading mechanism of the apparatus, and said mechanism comprising means for moving the cassette slide toward the rear wall of the housing into the slide open position only after each respective projection has been disengaged from the slot.

5. A combination as claimed in claim 2, characterized in that the loading device comprises detection means, responsive to the bottom section being in the first position, for detecting the presence of the cassette housing on the bottom section only if said projections engage said slot.

6. A combination as claimed in claim 5, characterized in that said detection means comprises a switching element disposed in an area between the projections, said switching element projecting from said bottom section to a level below the free ends of the projections.

7. A combination as claimed in claim 6, characterized in that the loading device comprises means for permitting relative movement of each projection with respect to the bottom section, for disengaging each projection from said slot during movement of the bottom section from its first to its second position.

8. A combination as claimed in claim 7, characterized in that said means for permitting comprises at least one movable element connected to the loading device and supporting a said projection, and movable to displace the respective projection during movement of the bottom section, said loading device forming part of a loading mechanism of the apparatus, and said mechanism comprising means for moving the cassette slide toward the rear wall of the housing into the slide open position only after each respective projection has been disengaged from the slot.

9. A magnetic-tape-cassette apparatus comprising an apparatus casing and a loading device, said loading device being movable in a direction of movement of between a first position substantially outside the apparatus casing and a second position substantially inside said casing, said loading device being adapted to receive a cassette of the type comprising a housing having a bottom wall, two facing side walls, a rear wall and a front wall, said bottom and side walls having respective raised portions; and a U-shaped slide having a main portion and two side portions, so arranged on the outside of the housing that the main portion is slidable along the housing bottom wall between a closed position and an open position, and the side portions are slidable along the respective facing side walls, said side portions each extending from the main portion to substantially half the height of the adjacent side wall, the slide having a rear edge facing said rear wall, in the closed position of the slide said rear edge being spaced from front edges of said raised portions of the bottom wall and the side walls, such that in the closed position of the slide an elongated slot is formed in the housing between the front edges of the raised portions and the rear edge of the slide, said slot extending in a longitudinal direction parallel to said rear wall across the entire width of the bottom, and up said side walls to substantially half the height of the side walls, and said slot being situated a shorter distance from the cassette rear wall than from the front wall, characterized in that the loading device comprises two positioning elements, each arranged adjacent a respective side of the bottom sections, at least in the first position of the loading device said positioning elements projecting upwardly from the bottom section to engage in respective parts of the slot situated between a respective slide side portion and the respective adjacent raised portions of the housing side walls of a properly positioned cassette of said type placed on said bottom section, said positioning elements thereby unambiguously defining the inserted position of the cassette relative to the loading device.

10. An apparatus as claimed in claim 9, characterized in that said bottom section sides are facing sides extending parallel to said direction of movement of the loading device, and in that each positioning element comprises a respective projection disposed near a respective facing side of the bottom section and having a respective free end.

11. An apparatus as claimed in claim 10, characterized in that the loading device comprises detection means, responsive to the bottom section being in the first position, for detecting the presence of a said cassette housing on the bottom section only if said projections engage said slot.

12. An apparatus as claimed in claim 11, characterized in that said detection means comprises a switching element disposed in an area between the projections, said switching element projecting from said bottom section to a level below the free ends of the projections.

13. A magnetic-tape-cassette apparatus comprising an apparatus casing and a loading device, said loading device being movable in a direction of movement of between a first position substantially outside the apparatus casing and a second position substantially inside said casing, said loading device being adapted to receive a cassette of the type comprising a housing having a bottom wall, two facing side walls, a rear wall and a front wall, said bottom and side walls having respective raised portions; and a U-shaped slide having a main portion and two side portions, so arranged on the outside of the housing that the main portion is slidable along the housing bottom wall between a closed position and an open position, and the side portions are slidable along the respective facing side walls, said side portions each extending from the main portion to substantially half the height of the adjacent side wall, the slide having a rear edge facing said rear wall, in the closed position of the slide said rear edge being spaced from front edges of said raised portions of the bottom wall and the side walls, such that in the closed position of the slide an elongated slot is formed in the housing between the front edges of the raised portions and the rear edge of the slide, said slot extending in a longitudinal direction parallel to said rear wall across the entire width of the bottom, and up said side walls to substantially half the height of the side walls, and said slot being situated a shorter distance from the cassette rear wall than from the front wall, characterized in that the loading device comprises two positioning elements having respective free ends, each arranged adjacent a respective side of the bottom sections, at least in the first position of the loading device said positioning elements projecting upwardly from the bottom section to engage in respective parts of the slot situated between a respective slide side portion and the respective adjacent raised portions of the housing side walls of a properly positioned cassette of said type on said bottom section, and said loading device further comprises means for permitting relative movement of each projection with respect to the bottom section, for disengaging each projection from said slot during movement of the bottom section from its first to its second position, said positioning elements thereby unambiguously defining the inserted position of the cassette relative to the loading device without interfering with slide movement of a received cassette which is being moved into a position within the apparatus casing.

14. An apparatus as claimed in claim 13, characterized in that said means for permitting comprises at least one movable element connected to the loading device and supporting a said projection, and movable to displace the respective projection during movement of the bottom section, said loading device forming part of a loading mechanism of the apparatus, and said mechanism comprising means for moving the cassette slide toward the rear wall of the housing into the slide open position only after each respective projection has been disengaged from the slot.

15. An apparatus as claimed in claim 14, characterized in that the loading device comprises detection means, responsive to the bottom section being in the first position, for detecting the presence of the cassette housing on the bottom section only if said projections engage said slot.

16. An apparatus as claimed in claim 13, characterized in that the loading device comprises detection means, responsive to the loading device being in the first position, for detecting the presence of a said cassette housing on the bottom section only if said projections engage said slot.

17. An apparatus as claimed in claim 16, characterized in that said detection means comprises a switching element disposed in an area between the projections, said switching element projecting from said bottom section to a level below the free ends of the projections.

* * * * *